United States Patent Office 2,710,705
Patented June 14, 1955

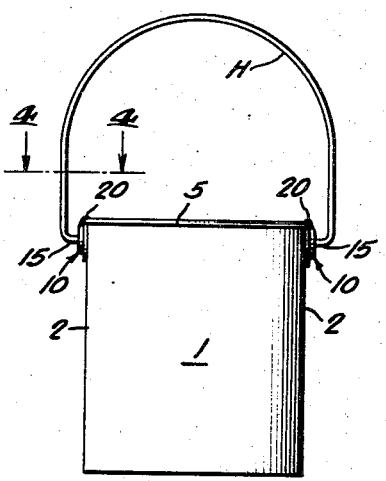
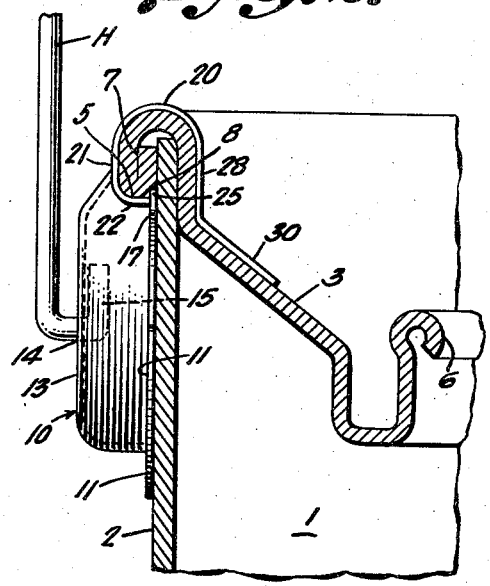
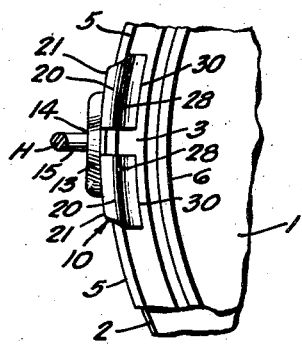
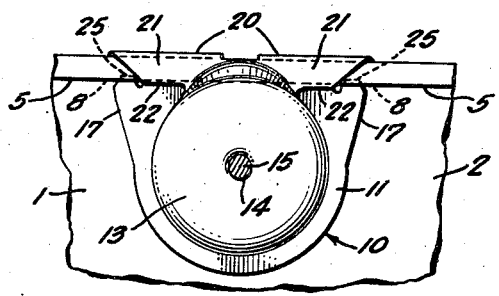
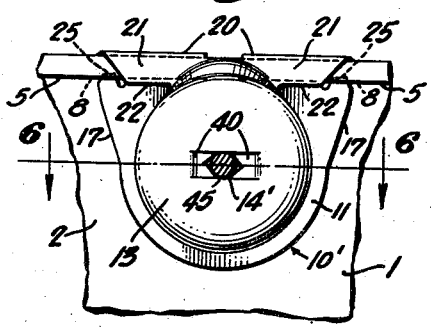
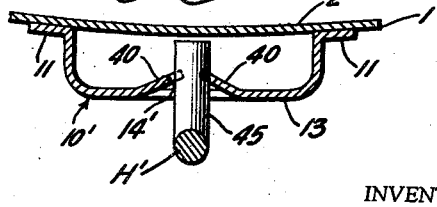
INVENTORS
JOHN BALINT
LEONARD R. MEHLMAN
STEVE J. ANDREWS
BY
ATTORNEY

2,710,705
CAN HANDLE SECURING DEVICES

John Balint, Leonard R. Mehlman, and Steve J. Andrews, Cleveland, Ohio, assignors to Tinnerman Products, Inc., Cleveland, Ohio, a corporation of Ohio Application February 29, 1952, Serial No. 274,202

1 Claim. (Cl. 220—91)

This invention relates in general to containers such as paint cans, buckets and similar receptacles having handles or bails for carrying the same, and is directed, more particularly, to the securing of a handle or bail to such a container by a bail ear which is self-retained in attached position on the container.

In many instances, there is an important need for securing a handle or bail to a container in the manner of an attachment as, for example, after the container has been filled, and preferably by bail ears adapted to be easily and quickly attached to the upper rim of the container without the use of solder, welding, rivets or other extraneous fastening means, and which bail ears will not slip or disconnect from attached position on the rim of the container under the constant lifting force to which the handle is subjected in the use of the container.

A primary object of the invention is to provide an improved bail ear construction of this character in the form of a clip device provided with integral anchoring means and which is adapted to be easily and quickly attached onto the rim of the container in a positively locked connection that will remain fixed and unyielding under any intended lifting force to which the handle or bail of the container may be subjected.

Another object of the invention is to provide such a bail ear in the form of a clip device having integral anchoring means for effecting a positive lock of the bail ear in attached position on the rim of the container, as aforesaid, together with an integral projecting flange on the bail ear for abutting a top surface of the container adjacent the rim to create a bending moment for resisting any tendency of the bail ear to disconnect from the rim of the container when the handle is lifted and this lifting force transmitted to the bail ear.

A further object of the invention is to provide an improved bail ear construction, such as described, in the form of a clip device which is adapted to be self-retained in attached position on the rim of a container in which the rim defines a groove at its underside adjacent the wall of the container, and with said bail ear comprising an inverted U-shaped clip portion for gripping said rim of the container together with anchoring means in the form of tabs, prongs, teeth or the like, adapted to bite into said groove at the underside of said rim to provide a positive lock of the bail ear in attached position on said rim of the container. And another more specific object of the invention is to provide such a clip-type of bail ear construction which includes an inwardly extending flange that bears upon the top of the container in cooperation with said anchoring means in a manner whereby said flange is adapted to create a bending moment resisting disconnection of the bail ear from attached position on the rim of the container incidental to the force transmitted to said bail ear when the container is lifted by the handle connected to said bail ear.

Further objects and advantages and other new and useful features in the construction and arrangement of the improved bail ear of the invention will be readily apparent as the following description proceeds with reference to the accompanying drawings, for purposes of illustration, but not of limitation, in which like reference characters designate like parts throughout, and in which:

Fig. 1 is a front elevational view of a container showing a pair of similar bail ears provided in the form of clip devices in accordance with the invention as employed for securing a handle to the container;

Fig. 2 is a greatly enlarged sectional view through the container seen in Fig. 1 on a plane in front of a bail ear showing the bail ear in edge elevation and the elements thereof engaging the rim of the container in the attached position of the bail ear;

Fig. 3 is a side view of Fig. 2 on a smaller scale showing the bail ear in front elevation with the end of the handle shown in section at its point of entry into the aperture in the boss of the bail ear; and, Fig. 4 is a top plan view of the bail ear, as along line 4—4 of Fig. 1, showing the upper portion of the bail ear as attached to the rim of the container with the inwardly extending flange thereof bearing on the adjacent top section of the container.

Fig. 5 is a view similar to Fig. 3 showing another form of bail ear construction in accordance with the invention; and, Fig. 6 is a sectional view on line 6—6 of Fig. 5.

Referring now, more particularly, to the drawings, there is shown in Fig. 1, a container 1 having a side wall 2 and a top section 3 joined to said side wall in a rim 5. The top section 3, as provided in a conventional paint can, for example, is formed as a generally horizontal or downwardly sloping surface leading to a circular beaded opening 6 defining a seat for a circular lid (not shown) having a friction or press fit in said opening 6.

A widely used type of paint can and similar container of this character is fabricated with said top section 3 joined to the side wall 2 in a pronounced rim 5 provided, as illustrated in Fig. 2, by forming the outer peripheral edge of said top section 3 in a doubled return bend 7 that is crimped or swaged over the adjacent upper end of the side wall 2. The pronounced rim 5, thus provided, necessarily presents a well defined groove 8 or valley at the underside of said rim 5 in the space between said rim and the side wall 2, as clearly seen in the enlarged showing of Fig. 2.

In accordance with the invention, this pronounced rim 5 on such a container is utilized for attaching a pair of similar oppositely disposed, clip-type bail ears, designated generally 10, by which a conventional wire handle H, or the like, is easily and quickly secured to the container 1, as illustrated in Fig. 1, for use in the usual manner and for the usual purposes. The bail ear 10 is provided in the form of a clip device having preformed elements for engaging the rim 5 and adjacent portions of the can in a positively locked connection by which the bail ear is self-retained in attached position on the container and is fixed and unyielding in such attached position when the container is lifted and carried by the handle or bail H.

Figs. 2, 3 and 4 show the bail ear 10 in a preferred construction that is readily provided as an inexpensive stamping from any suitable sheet metal material, preferably relatively thin spring metal such as spring steel which is heat treated to provide the attaching elements of the device with the desired toughness and hardness for effecting a positive lock of the bail ear in attached position on the rim of the container. The bail ear 10 is formed with a body portion comprising a peripheral base 11 and a hollow boss or dome 13 pressed outwardly from said base 11 and provided with a central aperture 14 for receiving a bent end 15 of the bail or handle H. The end 15 of the bail or handle H may be formed in any other suitable way to be retained in said opening 14, as for example, by peening or bending said end to provide an enlargement thereon preventing removal thereof from said opening 14 in the bail ear.

The peripheral base 11 of the bail ear is of gradually increasing width toward its upper end to define relatively wide side areas or wings 17 lying substantially in the plane of the peripheral base 11; and said peripheral base 11 including said relatively wide side areas or wings 17 are all slightly dished to correspond substantially to the outer contour of the side wall 2 of the container adjacent the rim 5.

The attaching portion of the bail ear 10 is provided as an inverted generally U-shaped clip formation 20 comprising an outer jaw 21 and an inner jaw 28 adapted to cooperate therewith in gripping opposite surfaces of a portion of the rim 5 of the container. The outer jaw 21 is bent sharply outwardly adjacent the relatively wide side areas or wings 17 so as to define a horizontal shoulder or shoulder portions 22 for fitting over and engaging the lower edge of the rim 5. At each side of said outer jaw 21 the blank is provided with a cutout providing well defined projecting tabs 25 on the upper ends of the relatively wide side areas or wings 17 in the plane of said peripheral base 11. The extremities of said tabs 25 are actually sharp cutting edges extending slightly above the shoulder or shoulder portions 22 on the outer jaw 21. These tabs 25 are adapted to cut into and anchor in the surfaces bordering the groove 8, Fig. 2, between the rim 5 and the adjacent side wall 2 of the container in conjunction with the shoulder or shoulder portions 22 on the outer jaw 21 engaging the lower edge of the rim 5 in the attached position of the bail ear on said rim 5. Said anchoring tabs 25 have been found to be most effective when provided, as shown, in the manner of sharp cutting edges but may also be provided as tongues, pointed prongs or teeth, or the like, arranged to anchor in the groove 8 between the lower edge of the rim 5 and the adjacent side wall 2 of the container in the same general manner. In the preferred construction of such anchoring tabs 25 in the form of cutting edges, the outer, upper corners of said side areas or wings 17 preferably are bevelled off slightly as seen in Fig. 3, to permit said tabs 25 to penetrate freely into the groove 8 at the underside of the rim 5, as aforesaid.

The inner jaw 28 of the inverted generally U-shaped clip portion 20 is provided in a spacing from the outer jaw 21 slightly less than the thickness of said rim 5 such that said jaws 21, 28 must be spread apart and flexed on being applied to said rim to thereby grip opposing surfaces of said rim 5 under pronounced spring tension. Said inner jaw 28 is provided with an inwardly projecting extension in the form of a flange 30 extending free and in position to engage the surface of the top section 3 of the container adjacent the rim 5 in the attached position of the bail ear 10 on said rim of the container. Preferably said inner jaw 28 and the flange 30 extending therefrom are slotted as shown in Fig. 4 and the same biased slightly inwardly at each side of such slot to correspond substantially to the curvature of the can rim 5 in order to fit said rim 5 snugly in the most effective manner.

It will be understood that in securing the handle H to the container 1 by the bail ear 10 shown in detail in Figs. 2, 3 and 4, the bent portion 15 on each end of the handle is assembled through the aperture 14 in the boss or dome 13 of the bail ear 10, and the bail ears as thus connected to the ends of the handle, then attached to the rim 5 of the container to secure the handle thereon.

Figs. 5 and 6 show a similar form of bail ear 10' having the same general construction as that of Figs. 2, 3 and 4 for attaching the bail ear to the rim of the container, but in which the aperture 14' in the boss or dome 13 of the bail ear is provided with a clutch-type of securing means 40 for retaining a simple straight end portion 45 of a handle H', Fig. 6. A handle H' having straight ends involves an important savings in the cost of the handles while such a bail ear 10', as shown in Figs. 5 and 6, provides an advantageous alternate method of assembly in that the bail ears 10' may be first attached to the container and the handle H' thereafter secured to the bail ears 10' simply by pushing such straight ends 45 thereof into connected relation with said clutch-type of securing means 40.

The arrangement is such that the clutch-type of securing means 40 is provided by a pair of spaced horizontal slits on opposite sides of the aperture 14' thereby defining a pair of yieldable tongues 40 having their extremities adjacent said aperture 14'. Preferably the extremities of said tongues 40 are V-shaped and spaced apart a distance slightly less than the cross section of the straight end 45 of the handle to be secured thereto. Said tongues 40 initially lie substantially in the plane of the dome or boss 13 and are sprung inwardly, as seen in Fig. 6, as the straight end 45 of the handle is pushed axially through the aperture 14' between the extremities of said tongues 40. The V-shaped extremities of said tongues 40 thereupon serve as cutting edges engaging the end 45 of the handle in the manner of one-way clutch elements holding said straight end of the handle in connected position within the dome 13 of the bail ear and preventing any reverse movement thereof in the direction for disconnection from said bail ear 10', while otherwise permitting turning of said straight end 45 of the handle relatively to said tongues 40 while in connected relation therewith, as when the handle is lifted or pivoted from one side of the container to the other.

In either form of the invention, it will be understood that the bail ear is easily and quickly applied to attached position on the rim 5 of the container simply by holding the inverted generally U-shaped clip portion 20 thereof in position for the inner and outer jaws 21, 28, respectively, to clasp opposite surface portions of said rim 5 with the base portions 11 of the body of the bail ear extending downwardly in position to bear upon the adjacent side wall 2 of the container. A direct force on the clip portion 20 of the bail ear causes the jaws 21, 28, to flex and spread apart over the inner and outer surfaces of the rim 5 as necessary for the outer jaw 21 to fit over and engage the outer surface of the rim 5, Fig. 2, with the shoulder or shoulder portions 22 snapping into engagement with the lower edge of said rim 5 and the anchoring tabs 25 entering into the groove 8 between said rim and the adjacent side wall 2 of the container, as shown in Fig. 2 and illustrated by the broken line showing of said anchoring tabs 25 in Fig. 3.

At the same time, the inner jaw 28 of said clip portion 20 snaps over and engages the inner surface of said rim 5 with the flange or flange portions 30 resiliently bearing upon the adjacent top section of the container as seen in Figs. 2 and 4. Inasmuch as the initial spacing of the jaws 21, 28 is slightly less than the cross section of the rim 5, said jaws 21, 28, clasp the opposite engaged surfaces of said rim 5 in a tenacious, continuously effective spring gripping action. This spring gripping action of the jaws 21, 28 causes the sharp edges of the tabs 25 to move deeply into the groove 8 between the rim 5 and adjacent side wall 2 of the container such that said tabs 25 cut and bite into the surfaces of said rim and side wall bordering said groove 8 to anchor said clip portion 20 to the rim 5 in a positive lock.

In this relation, the flange or flange portions 30, Figs. 2 and 4, engage the top section 3 of the container to create a bending moment for resisting any force on the bail ear in a direction both upwardly and angularly outwardly from the side wall of the container in a manner which might tend to pull the body portion of the bail ear away from said side wall 2 and thereby cause a spreading of the jaws 21, 28, leading to disconnection of the bail ear from the rim 5 of the container. Such a force on the bail ear in a direction both upwardly and angularly outwardly is the usual force taking place on the bail ears when the container is lifted by the handle H and accordingly, the provision of the inwardly projecting flange or flange portions 30 is a highly important feature and advantage of the invention in that such projecting flange or flange portions 30 create a bending moment, as aforesaid, which prevents disconnection of the bail ear from attached position on the rim 5 of the container under the force transmitted to each bail ear when the container is lifted by the handle H connected to said bail ears.

Another important feature and advantage of the invention resides in the construction and arrangement of the tabs 25 as sharp distinct elements which anchor in the groove 8 between the lower edge of the rim 5 and the adjacent side wall 2 of the container. It will be appreciated that said tabs 25 serve not only as anchoring means providing a positive lock of the clip portion 20 in attached position on the rim 5 of the container, as aforesaid, but also define pronounced abutments on the side areas or wings 17 which are maintained in close flush relation to the side wall 2 of the container in a manner whereby said tabs 25 positively engage the lower edge of the rim 5 in a direct upward thrust when the container is lifted by the handle H and this lifting force transmitted to the bail ears 10. In this regard, said side areas or wings 17 carrying the tabs 25, are maintained in close, flush engagement with the side wall 2 of the container under the compressive force of the outer jaw 21 of the clip portion 20 in gripping engagement with the rim 5 of the container, as aforesaid. Accordingly, when the container is lifted by the handle H, the tabs 25, in thus serving as abutments engaging the lower edge of the rim 5 in a direct upward thrust, necessarily take a considerable amount of the load of the container on the bail ear which, of course, is particularly important when the container is heavily loaded or overloaded. Consequently, the side areas or wings 17, carrying said tabs 25, preferably are strengthened by forming the same in a gradually increasing width or outwardly flared relation upwardly toward said tabs 25, substantially as shown in Fig. 3.

While the invention has been described in detail with specific examples, such examples are intended as illustrations only inasmuch as the invention fully contemplates various modifications which may be provided without departing from the spirit and scope of the invention.

What is claimed is:

A completely preformed bail ear adapted to be applied and secured solely by snap fastening action in self-retained attached position onto the rim of a container having a top section joined to a side wall in a rim defining a groove between the lower edge of said rim and the adjacent side wall of the container, said bail ear comprising a piece of sheet metal defining a body portion including a base adapted to bear on said side wall of the container and having a boss projecting outwardly from said base and provided with an aperture for receiving an end of a handle for the container, said body portion of the bail ear extending into a preformed inverted generally U-shaped clip portion comprising cooperating resilient inner and outer jaws which initially are substantially in contact and expansible for positive gripping relation with opposite surfaces of said rim of the container, said inner jaw carrying spaced extensions defining spaced flanges the free ends of which are bent to diverge angularly from said outer jaw in position for bearing on said top section of the container when said preformed clip portion is applied in said gripping relation with said rim of the container, said outer jaw comprising spaced shoulders engageable with the lower edge of said rim, and said base carrying spaced anchoring tabs at the ends of said outer jaw substantially in line with said shoulders, said anchoring tabs being spaced from the bight of said preformed clip portion in position to bite into the surfaces of said groove between said rim and the side wall of the container to anchor said preformed clip portion in said gripping relation with said rim together with said spaced shoulders on the outer jaw engaging the lower edge of said rim and with said flanges carried by said inner jaw bearing on said top section of the container.

References Cited in the file of this patent

UNITED STATES PATENTS

| | | |
|---|---|---|
| 239,484 | Geren | Mar. 29, 1881 |
| 309,711 | Hagerty et al. | Dec. 23, 1884 |
| 688,365 | Thatcher | Dec. 10, 1901 |
| 896,026 | Larkin | Aug. 11, 1908 |
| 1,917,284 | Young | July 11, 1933 |
| 2,052,855 | Walter | Sept. 8, 1936 |
| 2,571,369 | King et al. | Oct. 16, 1951 |

FOREIGN PATENTS

| | | |
|---|---|---|
| 224,116 | Great Britain | Nov. 6, 1924 |